United States Patent [19]

Buralli et al.

[11] Patent Number: 5,013,133
[45] Date of Patent: May 7, 1991

[54] DIFFRACTIVE OPTICAL IMAGING LENS SYSTEMS

[75] Inventors: Dale A. Buralli, Rochester; G. Michael Morris, Fairport, both of N.Y.

[73] Assignee: The University of Rochester, Rochester, N.Y.

[21] Appl. No.: 372,735

[22] Filed: Jun. 28, 1989

Related U.S. Application Data

[63] Continuation-in-part of Ser. No. 264,755, Oct. 31, 1988.

[51] Int. Cl.$^5$ .......................... G02B 5/18; G02B 27/44
[52] U.S. Cl. .......................... 350/162.11; 350/162.16; 350/162.19; 350/320
[58] Field of Search .................. 350/162.11–162.16,, 350/162.22, 3.71–3.75, 6.91, 162.17–162.24, 448–452, 320; 356/371–376; 358/494, 481; 250/492.1

[56] References Cited

U.S. PATENT DOCUMENTS

| | | | |
|---|---|---|---|
| 3,980,397 | 9/1976 | Judd et al. | 350/162.11 |
| 4,210,391 | 7/1980 | Cohen | 350/162.16 |
| 4,340,283 | 7/1982 | Cohen | 350/162.16 |
| 4,400,063 | 8/1983 | Hayashida | 350/6.91 |
| 4,550,973 | 11/1985 | Hufnagel | 350/3.72 |
| 4,637,697 | 1/1987 | Freeman | 350/162.16 |

OTHER PUBLICATIONS

D. Fakus & G. M. Morris, Opt. Eng. 28(6), 592–598 (1989) "Broadband Imaging with Holographic Lenses".

*Primary Examiner*—Bruce Y. Arnold
*Assistant Examiner*—Thong Nguyen
*Attorney, Agent, or Firm*—Martin LuKacher

[57] ABSTRACT

A diffractive imaging lens, has a diffractive optical element and an aperture stop remote from the lens in the direction of the object to be imaged which corrects the lens for coma, astigmatism, and field curvature and which can be corrected for spherical aberration by using a phase corrector in the aperture of the stop. The lens system may be provided in anamorphic configuration.

25 Claims, 8 Drawing Sheets

DIFFRACTIVE OPTICAL IMAGING LENS SYSTEMS

This application is a continuation-in-part of our application Ser. No. 07/264,755, filed in the U.S. Patent and Trademark Office on Oct. 31, 1988.

BACKGROUND OF THE INVENTION

The present invention relates to diffractive optical systems having image forming capability, and particularly to a diffractive optical imaging lens system which is corrected for aberrations.

1. Field of the Invention

The invention is especially suitable for use as a landscape lens as well as a lens having finite conjugates and provides imaging with monochromatic illumination. The invention also provides an f-theta scan lens useful in laser scanners. The diffractive lens is preferably of zone plate configuration which can be stamped or pressed in a medium transparent to the illumination, such as plastic. The lens may also be a holographic element, either optically recorded or computer-generated.

2. Description of the Related Art

Diffractive optical elements have not been used for imaging since they produce unacceptably large amounts of image aberration except in the immediate vicinity of the optical axis. Reference may be had to the following patents and publications for further information respecting diffractive lenses, and particularly hologram lenses: G. P. Sincerbox, "Formation of Optical Elements by Holography", IBM Tec. Disclosure Bull, 10, 267 (1967); Brooks et al., U.S. Pat. No. 3,578,845 of May 18, 1971; Tatsuno et al., U.S. Pat. No. 4,688,880, Aug. 25, 1987; Kuwayama et al., U.S. Pat. No. 3,626,679, Dec. 2, 1986; Withrington, U.S. Pat. No. 3,940,204, Feb. 24, 1976; Antonson et al., U.S. Pat. No. 3,737,212, June 5, 1973; Tien, U.S. Pat. No. 4,140,362, Feb. 20, 1979; and Bjorklund et al., U.S. Pat. No. 4,432,597, Feb. 21, 1984. It has been proposed to correct a diffractive optical element for phase errors thereby providing a corrected Fourier-transform lens. See J. Kedmi and A. A. Friesem, "Optimal Holographic Fourier-Transform Lens", Applied Optics, 23, 22, 4015–4019 (15 Nov. 1984); and J. N. Cederquist and J. R. Fienup, "Analytic Design of Optimum Holographic Optical Elements", J. Opt. Soc. Am. A, 4, 4, 699–705 (April 1987). Diffractive optical elements have, however, not been considered useful for imaging of objects (as contrasted with conventional glass lenses) because of the large amounts of aberration introduced by the diffractive lens in the image plane.

SUMMARY OF THE INVENTION

It is the principal object of the present invention to provide an improved system (method and apparatus) for imaging with a diffractive lens which is capable of correcting for aberrations including coma, astigmatism, flatness of field (field curvature or Petzval curvature) and which may be corrected for spherical aberration whereby to provide imaging performance which is superior to conventional (glass) systems of similar complexity.

It is another object of the invention to provide an improved diffractive lens system for forming images of objects which can be produced at low cost, and even at a fraction of the cost of conventional lens systems, which provide like or less superior performance. In accordance with this object of the invention, the diffractive lens may be formed by pressing or stamping, a zone plate, which provides the lens, out of plastic thereby avoiding the grinding and polishing requirements of conventional lenses.

It is another object of the present invention to provide an improved imaging system with a diffractive lens having finite conjugates (may be designed with specific focal lengths to an object and to an image plane) and which is also corrected for aberrations, and can be corrected to provide flat field imaging.

It is another object of the present invention to provide an improved laser diffractive scan lens which satisfies the f-$\theta$ condition where f is the focal length and $\theta$ is the scan angle, and which is corrected for aberration, to provide flat field imaging.

DETAILED DESCRIPTION

Briefly described, the invention reduces aberrations in the image of an object formed by a diffractive optical lens by positioning an aperture stop through which the optical axis of the lens passes at a location spaced from the lens in the direction having the longest conjugate distance (longest distance to the focus either at the object or image) preferably in the front focal plane of the lens where the object is far distant (as in the case of a landscape lens). Then, in the paraxial case where the object is far (effectively infinitely) distant, coma, astigmatism, distortion and field curvature are reduced to zero. By locating a phase corrector plate in the aperture (an aspheric corrector plate—"Schmidt Camera Type"), spherical aberration can be corrected. The lens may be made in anamorphic configuration by providing diffraction zones which are in parallel relationship. In the finite conjugate case the lens system can also be corrected by positioning the aperture stop and providing sufficient zone spacing. The distortion can be controlled to provide an f-$\theta$ scan lens.

The foregoing and other objects, features and advantages of the invention as well as presently preferred embodiments thereof will become more apparent from a reading of the following description in connection with the accompanying drawings. Still further specification of the invention and the mathematical derivations relating thereto may be obtained from a reading of an article by D. A. Buralli and G. M. Morris, "Design of a Wide-Field Diffractive Landscape Lens" which was attached as an appendix to this specification and now appears in *Applied Optics*, Vol. 28, No. 18, 15 Sept., 1989, pages 3950 to 3959.

DETAILED DESCRIPTION

Figure 1:
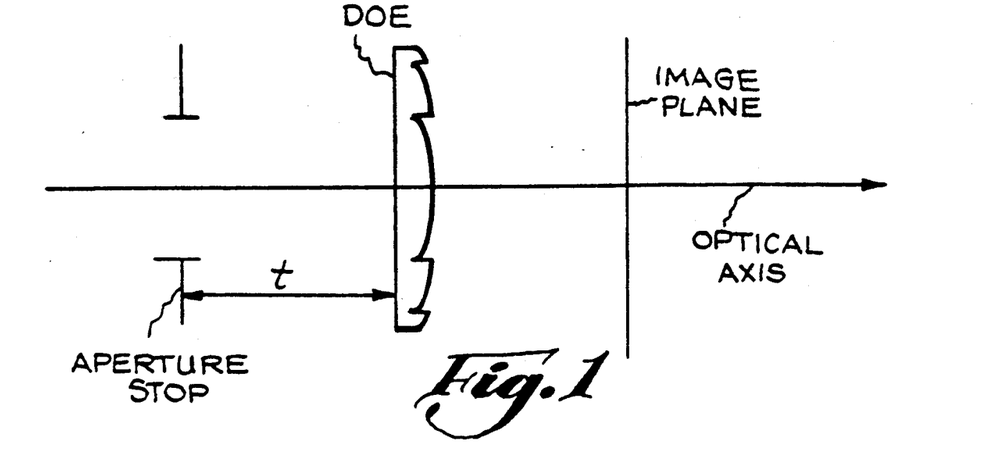
FIG. 1 is a schematic view of a diffractive imaging lens system embodying the invention which provides a telecentric paraxial diffractive landscape lens system.
Figure 4A:
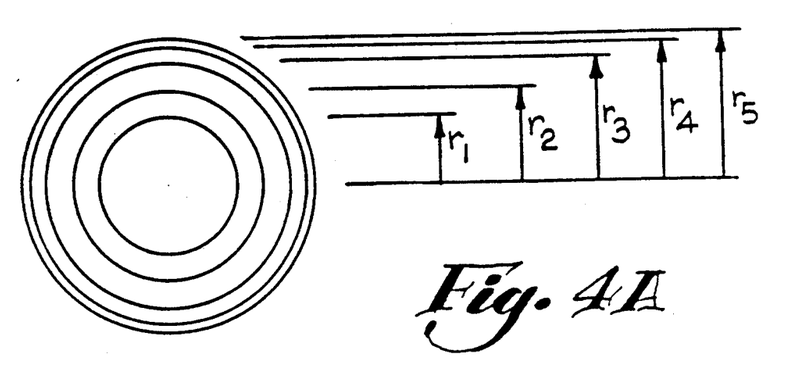
FIG. 4A is a front view of the paraxial diffractive lens which is of the type shown in FIGS. 1–3. Only an exemplary number of zones are shown to simplify the illustration, it being appreciated that a large multiplicity of zones, for example 1700 in number, may suitably be used in a practical lens system.

Referring to FIG. 1, there is shown a lens system including a zone plate type diffractive lens which is labeled DOE. While a zone plate type lens having a diffractive surface with a central circular zone of radius $r_1$ (see FIG. 4A), and annular zones between radii $r_1$ and $r_2$, $r_2$ and $r_3$, ... are shown, the term DOE refers to all optical elements, including lens and mirrors, that utilize diffraction in an image-forming capability. In FIG. 1, the DOE faces the image plane. The optical axis extends through the center of the DOE. Spaced from the DOE in the direction of the object, which in the case of a transmissive system (as shown) is on the opposite side of the DOE from the image plane, is an aperture stop. The center of the aperture stop (the aperture) is intersected by the optical axis. The system is telecentric in image space. The paraxial chief ray, i.e., the ray that passes through the center of the aperture stop, intersects the lens at a distance $\bar{y}0$ along the meridian of the lens which is perpendicular to the optical axis.

The illustrated lens is a telecentric paraxial landscape lens system since an object at infinity will have its image focused in the image plane. The lens system is designed to operate monochromatically so that the images are formed in the image plane when the light is of wavelength $\lambda_0$. $\lambda_0$ is referred to as the design wavelength. The lens system can operate with other wavelengths as will become apparent as the discussion proceeds. The focal length of the lens is f, thus the distance from the lens to the image plane on its backside and the distance of the lens to its focal plane on its front side (toward the object) ... for light of $\lambda_0$ is f. It can be shown that where the zone radii are defined by the following equation, wherein m is an integer indicating the number of the zone, $$r_m = \sqrt{2m\lambda_0 f} \tag{1}$$

and the aperture stop is utilized and is disposed remote from the lens, the spherical aberration $S_I$, coma $S_{II}$, astigmatism $S_{III}$, flatness of field (Petzval curvature of field) $S_{IV}$, and distortion $S_V$ can be expressed by the following equations:

$$S_I^* = \frac{y^4}{f^3}, \tag{2}$$

$$S_{II}^* = \frac{y^3 u(t-f)}{f^3}, \tag{3}$$

$$S_{III}^* = \frac{y^2 u^2 (t-f)^2}{f^3}, \tag{4}$$

$$S_{IV}^* = 0, \tag{5}$$

$$S_V^* = \frac{yu^3 t(3f^2 - 3tf + t^2)}{f^3} \tag{6}$$

In these equations, the term u is defined by:

$$\bar{y} = t\bar{u}, \tag{7}$$

The terms are barred to refer to the appropriate quantity for the paraxial chief ray.

It will be apparent from equations (2)-(6) that if the aperture stop is placed in the front focal plane (i.e., the lens is made telecentric in image space), then when t equals f, the resultant aberrations are:

$$S_I^* = \frac{y^4}{f^3}, \tag{8}$$

$$S_{II}^* = S_{III}^* = S_{IV}^* = 0. \tag{9}$$
$$S_V^* = yu^{-3}. \tag{10}$$

Figure 7A:
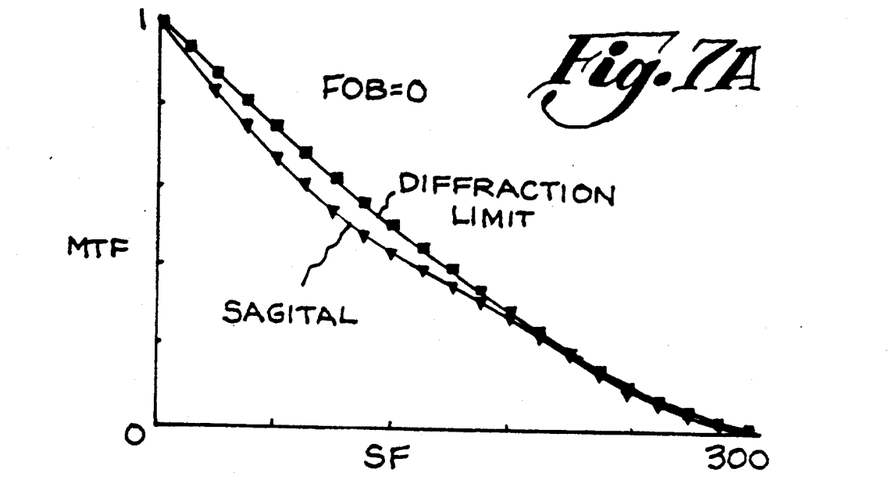
FIGS. 7A, B and C are plots showing the modulation transfer functions characterizing the performance of a telecentric paraxial diffractive lens system of the type illustrated in FIGS. 1 and 2.
Figure 7B:
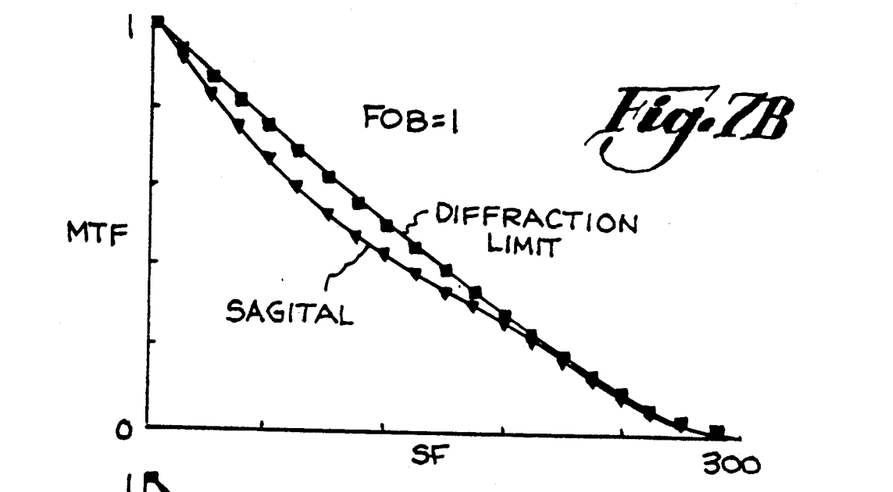
Figure 7C:
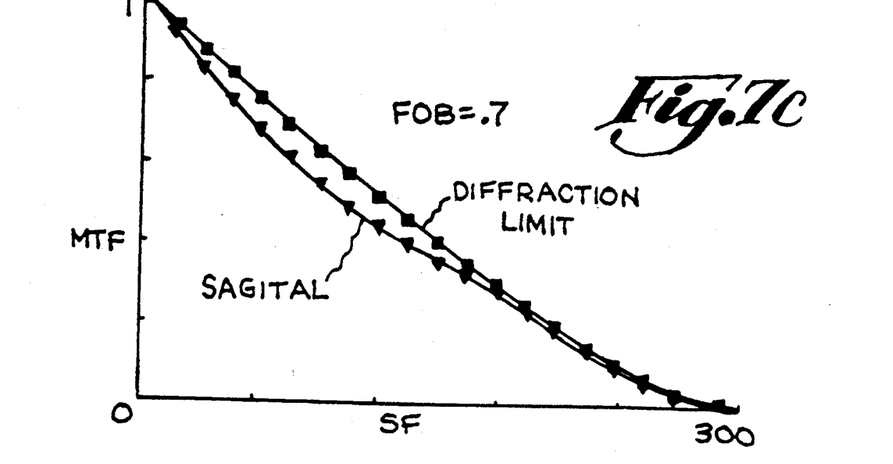
Figure 8A:
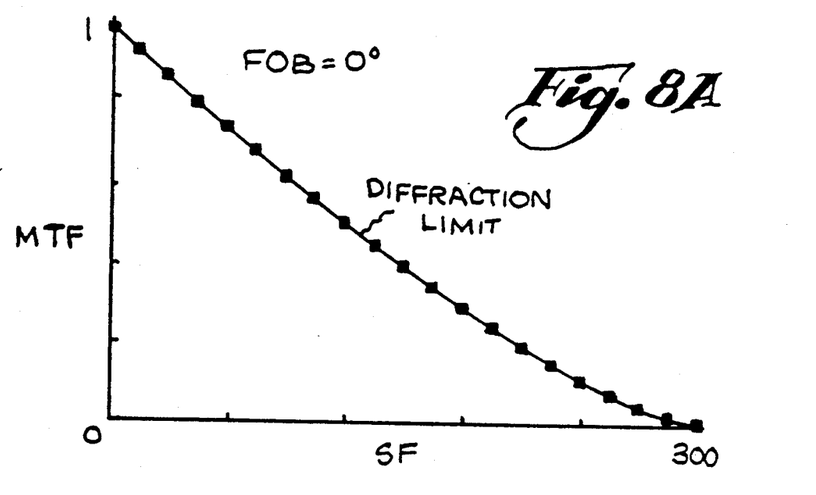
FIGS. 8A, B and C are plots of the modulation transfer functions characterizing the performance of a conventional, optically recorded holographic lens.
Figure 8B:
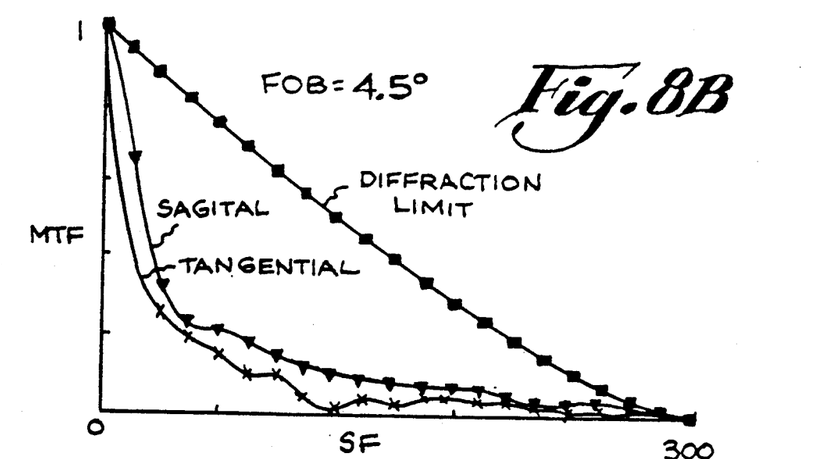
Figure 8C:
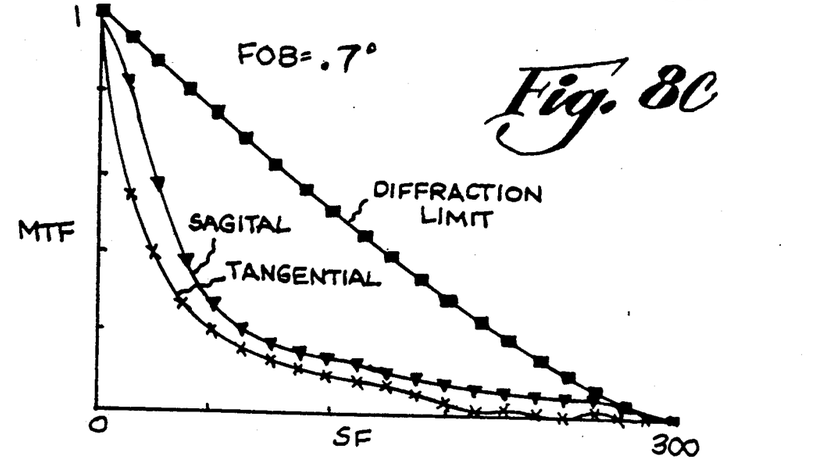
Figure 9:
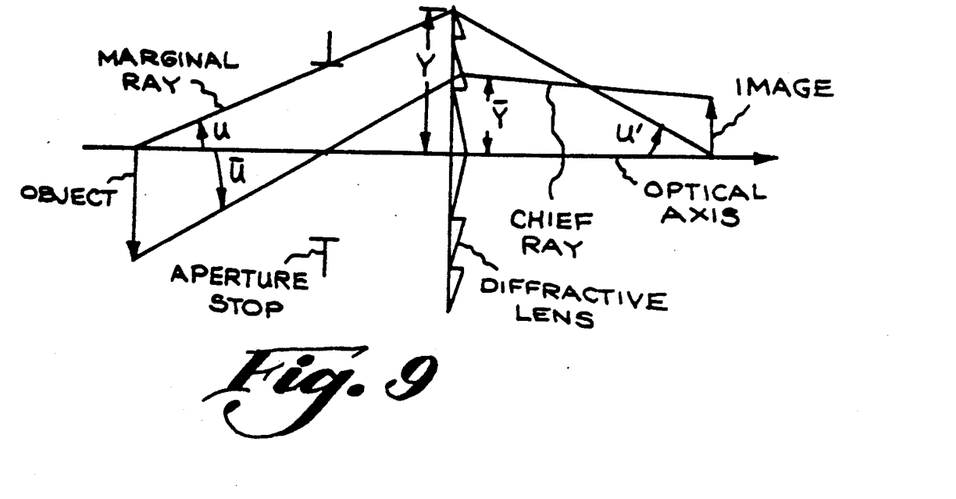
FIG. 9 shows the layout of an imaging system having finite conjugates in accordance with the invention, and consisting of a single lens with a remote aperture stop. In the figure, all indicated quantities are positive, with the exception of u'. The paraxial lateral magnification m is given by m=u/u'. The marginal ray passes through the edge of the aperture stop, while the chief ray passes through the center of the aperture stop.

Accordingly, field aberrations of coma, astigmatism and curvature of field are zero for objects at infinity. This allows for the imaging of extended objects with little variation of image quality across the field. The comparative performance of the lens system is shown by the plots in FIGS. 7A, 7B and 7C and plots of an equivalent conventional lens in FIGS. 6A, 6B and 6C and an equivalent holographic lens (in FIGS. 8A, 8B, 8C) where the radii of the zones in the x-y plane (perpendicular to the optical axis) are given by:

$$r_m = \sqrt{2m\lambda_0 f + (m\lambda_0)^2} \tag{11}$$

Figure 4B:
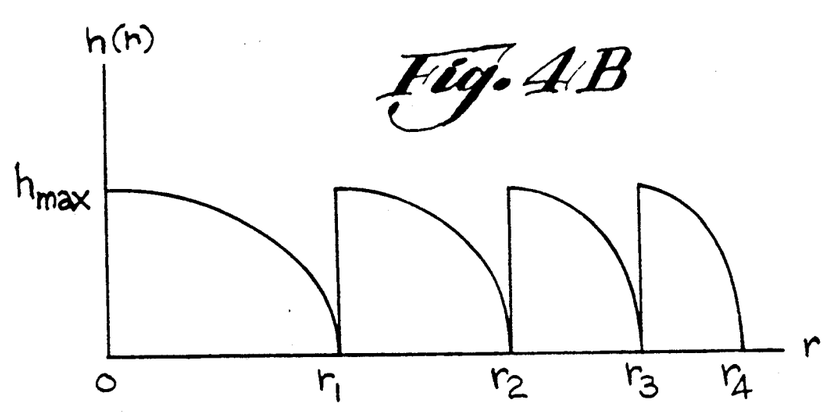
FIG. 4B is a plot illustrating the profile (in cross-section) of the diffractive surface of the lens shown in FIG. 4A.

The profile of the zones is illustrated in FIG. 4B. The height profile is chosen to produce 100% diffraction efficiency at $\lambda = \lambda_0$. Other profiles, such as a straight line profile, can be used with slight loss in diffraction efficiency. The zone boundaries as defined by the zone spacing equation determines the shape of the emerging wavefront. The height profile is defined by the following equation:

$$h(r) = h_{max}\left(1 - \frac{r^2}{2\lambda_0 f} + M\right), \tag{12}$$

where $$h_{max} = \frac{\lambda_0}{n(\lambda_0) - 1}, \tag{13}$$

$$M = m - 1 \text{ for } r_{m-1} \leq r < r_m. \tag{14}$$

Thus far it has been assumed that the DOE is being used at the design wavelength $\lambda_0$ so that the diffraction efficiency is maximized $n(\lambda_0)$ being the conventional symbol for the refractive index of the diffractive lens at the design wavelength $\lambda_0$. However, the aberrations can be reduced for any wavelength $\lambda$ if the stop-to-lens distance is $$t(\lambda) = \frac{\lambda_0 f}{\lambda} \tag{15}$$

The diameter of the aperture in the aperture stop is limited by the uncorrected spherical aberration which can be tolerated. Nevertheless, the single diffractive optical imaging system exhibits an isoplanatism comparative to refractive systems containing more elements. This will be apparent from a comparison of FIG. 6A, which is for a Cooke Triplet lens, while FIG. 7A is for a single lens system of the type shown in FIG. 1. If 0.95 $\lambda$ of spherical aberration is tolerated, the total aperture of the system (the radius of the aperture in the aperture stop), in order for the system not to exceed the Strehl tolerance limit, should satisfy the following equation:

$$y \leq \sqrt[4]{7.6 f^3 \lambda} \tag{16}$$

Figure 3:
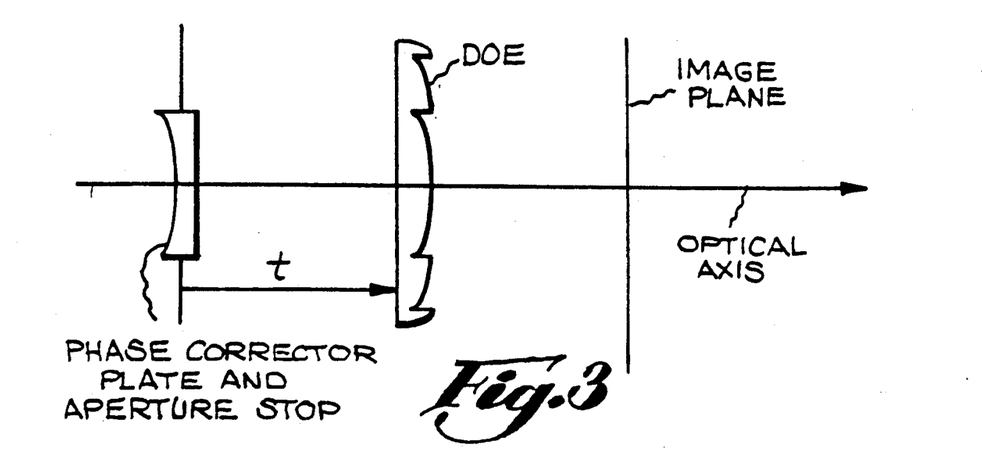
FIG. 3 is a view similar to FIG. 1 where a phase corrector plate is placed in the aperture stop to correct spherical aberration and is particularly useful where the system has a low F-number.

Spherical aberration can be corrected by using a phase corrector plate in the aperture of the aperture stop as shown in FIG. 3. The phase corrector plate is known as a "Schmidt camera type" aspheric corrector plate. This plate is suitably designed using conventional techniques for the design of such plates to correct the spherical aberration $S_I$ which is defined above.

Figure 2:
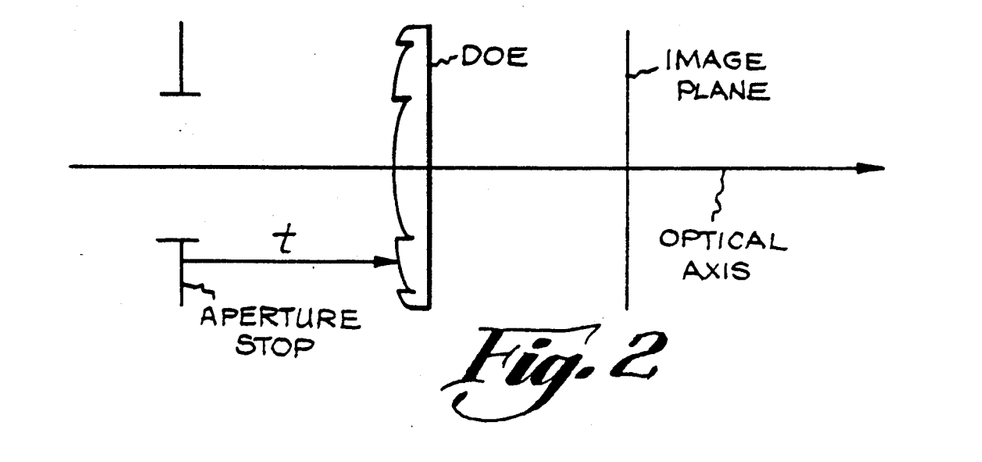
FIG. 2 is a view similar to FIG. 1 where the diffractive structure of the lens is facing away from the image plane.

Referring to FIG. 2, it will be seen that the DOE has its diffractive structure facing the object, rather than closest to the image plane which is the case shown in FIG. 1. The configuration of FIG. 2 may be preferable in lens applications involving a large field of view to avoid problems with total internal reflection.

Figure 5:
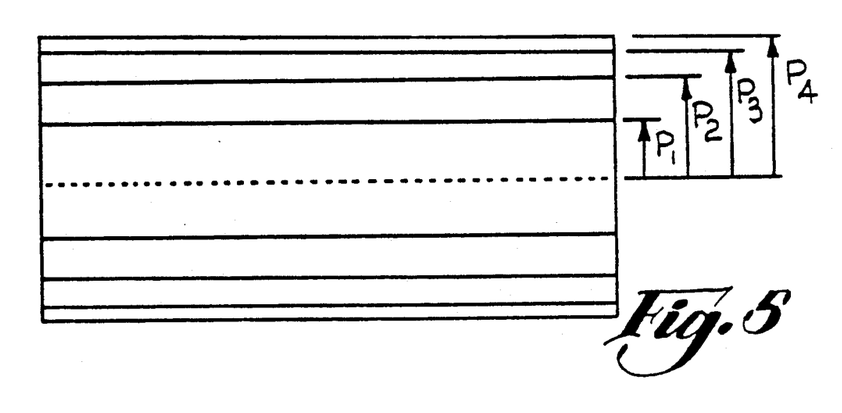
FIG. 5 is a front view of a cylindrical paraxial diffractive optical element which may be used in providing an anamorphic lens system embodying the invention.

The same design criteria may be used to provide an anamorphic lens system using a cylindrical diffractive lens as shown in FIG. 5. The zones n this lens are parallel to each other and their spacing from the center line (shown by the dashed line in FIG. 5) of the lens is defined by the following equation.

$$\rho_m = \sqrt{2m\lambda_0 f_p} \tag{17}$$

In equation (17) $f_p$ is the focal length of the cylindrical lens.

Figure 6A:
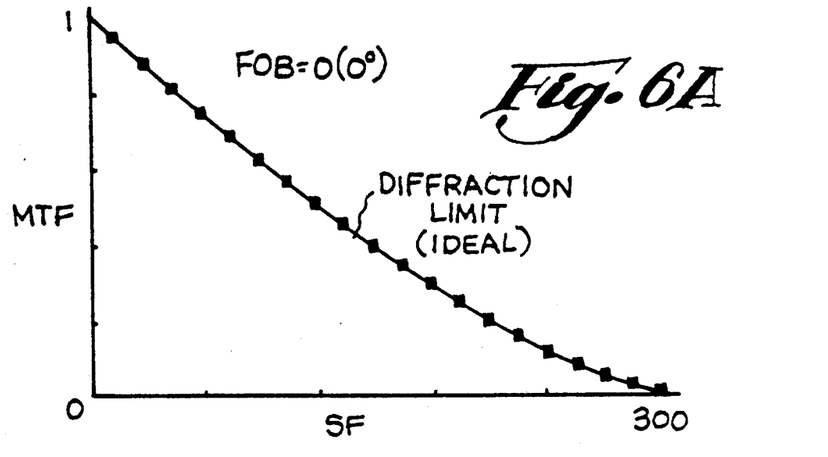
FIGS. 6A, B and C are plots of the modulation transfer functions of a conventional (glass) lens, specifically a Cooke Triplet-F/5.6, which characterizes the performance of such a lens and is used for comparison with similar pots which characterize the performance of a lens system embodying the invention as shown in FIGS. 1 and 2 (FIGS. 7A, B, and C) and a conventional optically recorded holographic lens (FIGS. 8A, B and C) all lenses and lens systems having the same F number.
Figure 6B:
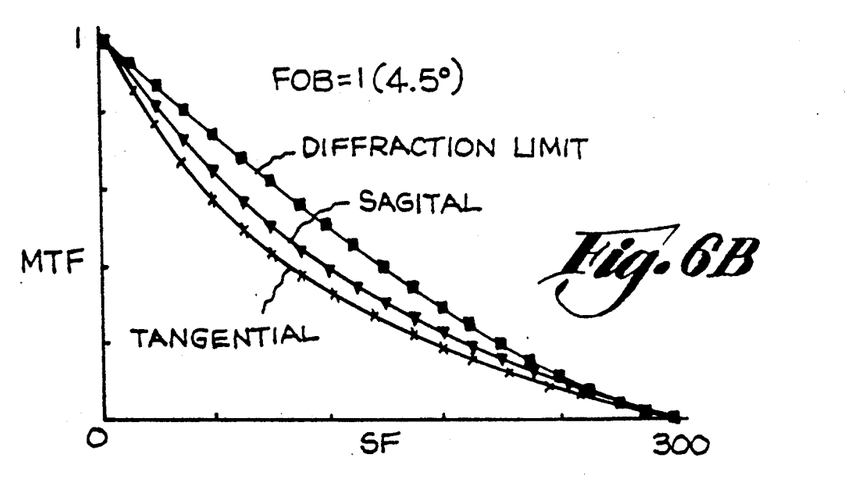
Figure 6C:
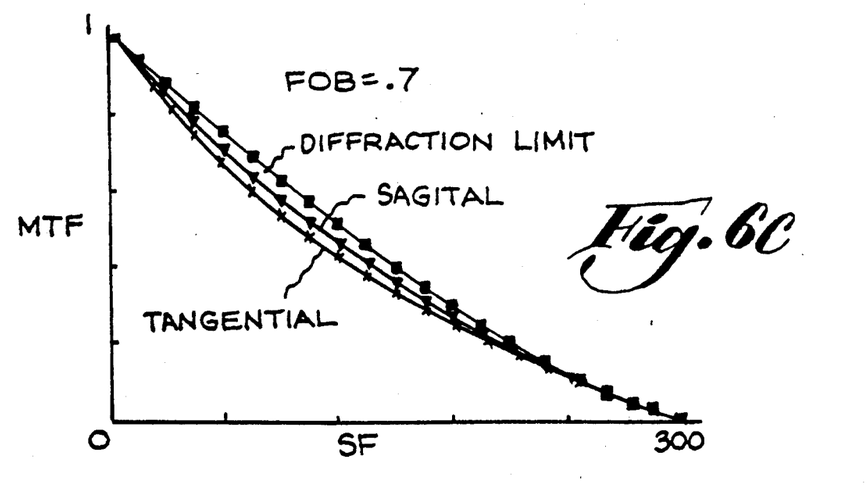

Referring to FIGS. 6A, B and C, the modulation transfer functions (MTF) for a conventional glass lens, specifically an F/5.6 Cooke Triplet are shown. FIG. 6A is for the case of a zero fractional object (FOB-0). This plot, thus, is along the optical axis. FIG. 6B shows the full extent of the object which in this exemplary case is 4.5 degrees. FIG. 6C shows an FOB of 0.7 which is for an intermediate height from that shown in FIG. 6A and 6B. An MTF of 1 means that the lens system replicates the object perfectly. This is the case on the optical axis for the conventional lens system as shown in FIG. 6A.

In these figures, the curves which are defined by the X's represent the MTF in the tangential direction while the curves drawn between the arrowheads represent the MTF in the sagittal direction. The curves drawn between the boxes are for the MTF at the ideal or diffraction limit of the lens. FIGS. 6B and C show a degradation of performance in the tangential and sagittal directions with the greater deviation being at the full extent of the object (FOB=1).

FIGS. 6A, B and C may be compared with the curves of FIGS. 7A, B and C, respectively, which are for the diffractive imaging system provided by the invention. In these figures, no correction for spherical aberration along the optical axis is considered. Therefore, there is some degradation along the optical axis as shown in FIG. 7A. This degradation can be removed by the use of the corrector plate as discussed above. Comparison of FIGS. 7B and 7C with FIGS. 6B and 6C illustrate that the performance of the lens provided by the invention, even though only a single element, is superior to the performance of the conventional lens. The performance of the inventive lens is far superior to the performance of a conventional holographic lens as will be apparent by comparison of FIGS. 7B and 7C and FIGS. 8B and 8C.

The invention so far describes the paraxial zone case where the lens is a landscape lens. The invention also provides diffractive imaging lenses with finite conjugates, and with reduced abberations, just as for the landscape lens.

Consider a diffractive lens with a rotationally-symmetric phase function defined by $$\Xi(r) = 2\pi(Ar^2 + Gr^4), \quad (18)$$

where r is the radial polar coordinate in the tangent plane to the diffractive lens and A is the coefficient of $r^2$ in the power series of the phase function. The Seidel aberrations for this diffractive lens, with aperture stop in contact are given by:

Spherical aberration $$S_I = \frac{y^4 \phi^3}{4}(1 + B^2 + 4BT + 3T^2) - 8\lambda G y^4 \quad (18a)$$

Coma $$S_{II} = \frac{-y^2\phi^2 H}{2}(B + 2T) \quad (18b)$$

Astigmatism
$$S_{III} = H^2\phi, \quad (18c)$$
Petzval curvature
$$S_{IV} = 0, \quad (18d)$$
Distortion
$$S_V = 0. \quad (18e)$$

Figure 11:
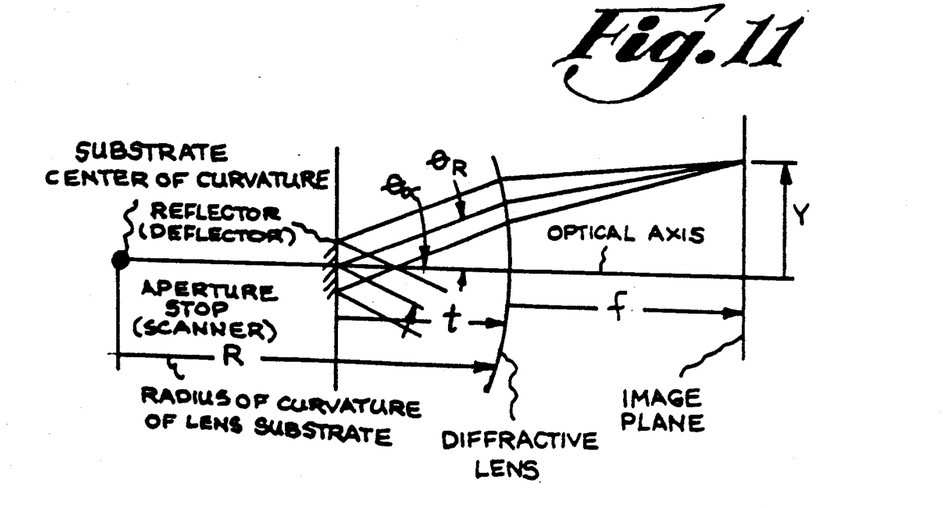
FIG. 11 is a simplified layout of a laser scanning diffractive lens. For plane wave illumination, incident at an angle $\theta$, the image height Y is given by Y=f$\theta$, where f is the focal length. This "f-theta" condition provides a constant scan velocity across the image plane.
Figure 12A:
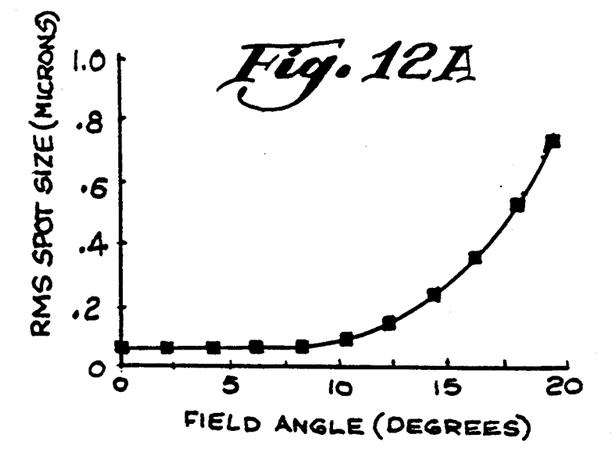
FIGS. 12A and B, respectively, are plots of root-mean-square spot size (geometrical) and image height versus scan angle for an exemplary curved diffractive scan lens in accordance with the invention. The design parameters were: focal length, f=310 mm, design wavelength=0.6328 microns; f-number, F/50. With these parameters, the Airy disk radius is approximately 39.1 microns, which corresponds to about 300 resolvable spots per inch.
Figure 12B:
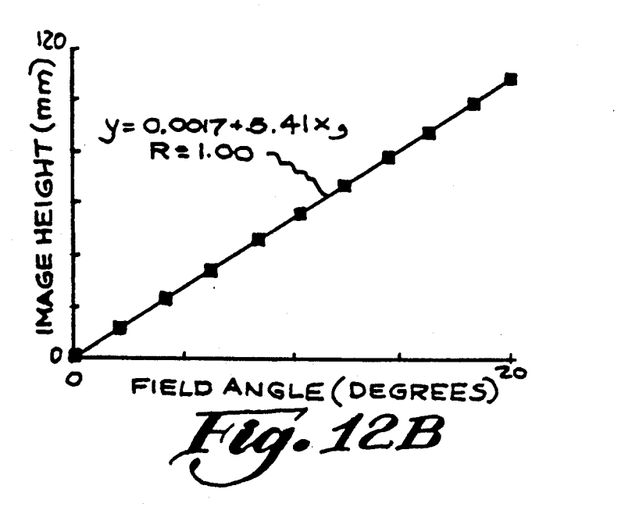
Figure 13A:
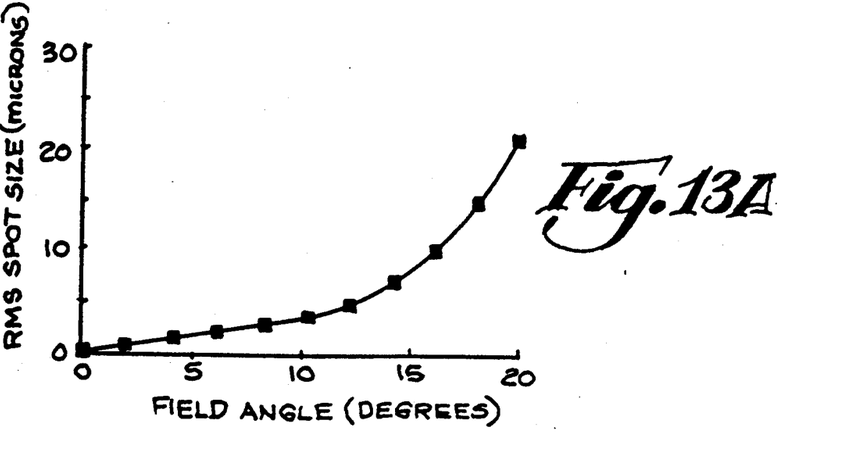
FIGS. 13A and B, respectively, are plots of root-mean-square spot size (geometrical) and image height versus scan angle for an exemplary planar diffractive scan lens in accordance with the invention. The design parameters were: focal length, f=310 mm, design wavelength=0.6328 microns; f-number, F/50. With these parameters, the Airy disk radius is approximately 39.1 microns, which corresponds to about 300 resolvable spots per inch.
Figure 13B:
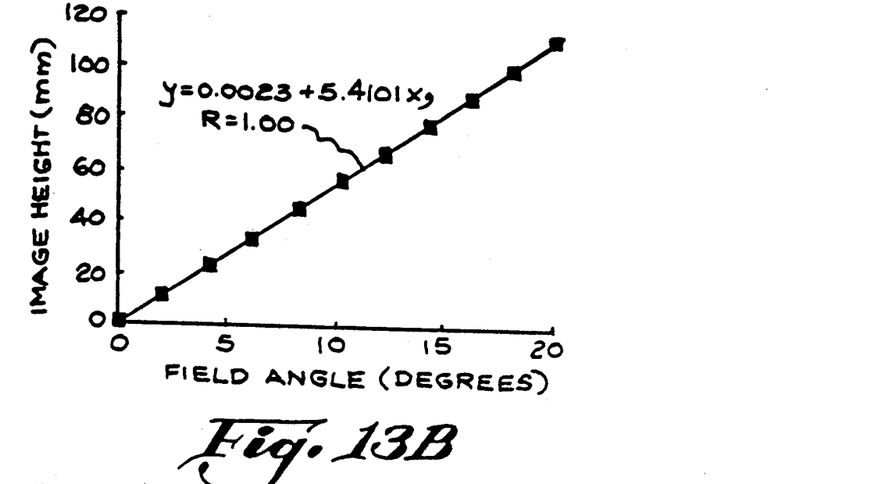

In Eqs. (18), y is the paraxial marginal ray height at the lens, $\phi = -2 A \lambda$ (exp[-i$\Omega$t] time dependence), assuming the first diffracted order is used ($\phi = 1/f$, where f is the focal length, note that $\phi(\lambda) = (\lambda/\lambda_0) \phi_0$, where $\phi_0$ is the power at the design wavelength $\lambda_0$.), $\lambda$ is the wavelength of the light, and H is the Langrange invariant, defined in general for any surface in an optical system by $$H = n(u\bar{y} - \bar{u}y), \quad (19)$$

where u refers to the paraxial ray angle for the paraxial marginal ray, and barred quantities refer to the corresponding value for the paraxial chief ray. Also, B is a bending parameter, defined as $$B = \frac{2c_{sub}}{\phi} \quad (20)$$

where $c_{sub}$ is the curvature of the diffractive lens substrate ($c_{sub}$ is positive if the center of curvature is to the right (image side) of the lens. Referring, to FIG. 11 shows the scanning configuration, there $$c_{sub} = -\frac{1}{R}$$

T is conjugate parameter, defined as $$T = \frac{u + u'}{u - u'} = \frac{m + 1}{m - 1}, \quad (21)$$

where m is the paraxial lateral magnification (m = u/u'). The stop shift equations relate the values of the aberrations after moving the aperture stop to their values before the shift. These equations are $$S_I^* = S_I, \quad (22a)$$
$$S_{II}^* = S_{II} + \epsilon S_I, \quad (22b)$$
$$S_{III}^* = S_{III} + 2\epsilon S_{II} + \epsilon^2 S_I, \quad (22c)$$
$$S_{IV}^* = S_{IV}, \quad (22d)$$
$$S_V^* = S_V + \epsilon(3S_{III} + S_{IV}) + 3\epsilon^2 S_{II} + \epsilon^3 S_I. \quad (22e)$$

In Eqs. 22, $\epsilon$ is the stop shift parameter, defined as $$\epsilon = \frac{\delta\bar{y}}{y}, \quad (23)$$

where $\delta\bar{y}_0$ is the change in chief ray height due to the stop shift. Note that $\epsilon$ is the same for every surface in a system.

For use in imaging of extended objects, we would like to have no coma and imaging on a flat field. We use the above quotations, setting $S^*_{II} = S^*_{III} = 0$, and solve for $\epsilon$ and G. The results are $$\epsilon = \frac{2H}{y^2\phi(B + 2T)} \quad (24a)$$

and $$G = \frac{\phi^3(1 - T^2)}{32\lambda}. \quad (24b)$$

With these choices of stop position and fourth-order phase term, the aberrations of the diffractive singlet are $$S^*_I = \frac{y^4\phi^3}{4}(B + 2T)^2, \quad (25a)$$

$$S^*_{II} = S^*_{III} = S^*_{IV} = 0, \quad (25b)$$

$$S^*_V = \frac{2H^3}{y^2(B + 2T)}. \quad (25c)$$

Using Eq. 18 and setting the phase $\phi_r = 2\pi m$, where m is a integer and the number of the zones of the diffractive lines the zone spacing for the flat field finite conjugate lens can be determined $$r_m = \sqrt{\frac{-A + \sqrt{A^2 + 4Gm}}{2G}} \quad (26)$$

m = 1, 2, 3 ... Note that if G = 0, which is for the paraxial landscape lens case, Eq. (18) reduces to $$\Phi(r) = 2\pi Ar^2$$
$$= \frac{\pi r^2}{\lambda f}$$

$r_m$ is then as given by equation (1). Note that zone spacings as defined in Eq. (26) represent full-wave zones. Other zone spacings are possible, e.g., one can define half-wave zone spacings by setting $\phi_r = \pi m$, where m is an integer, or two-wave zones by setting $\phi_r = 4\pi m$, where again m is an integer. These different definitions for zone spacing have do effect on aberration correction, but no affect diffraction efficiency. Thus in equation (1) the integer before m can be any integer preferably 1, 2, 4, 6, 8 ...

Accordingly a diffractive single lens with finite conjugates, no coma and flat field imaging is obtained by providing sufficient zone spacing and aperture stop displacement from the lens, as is determined by equation (24a), (24b) and (26). The lens may be planar, B = 0, but is preferably bent, and if bent may provide higher resolution than unbent and further control over the location of the aperture stop.

As an example of the use of these equations we can design a lens with the following parameters:
Design wavelength: $\lambda_0 = 0.6328$ μm
Focal length: $f = 100$ mm ($\phi = 0.01$ mm$^{-1}$)
Magnification: $m = -0.2$ (5:1 reduction)
(Object 600 mm to left of lens; image 120 mm to right of lens)
Object size: $h = -25$ mm (Image size = 5 mm)
Substrate curvature: $c_{sub} = 1/(6f) = 0.0016667$ mm$^{-1}$
(Bending parameter: $B = \frac{1}{3}$)
With this magnification, the conjugate parameter is $T = \frac{2}{3}$, so Eq. (24b) gives the value of G (using the design wavelength $\lambda_0$) as $$G = 2.7435 \times 10^{-5} \text{ mm}^{-4}.$$

Choosing a marginal ray height (y) of 7.5 mm at the lens gives a Lagrange invariant of $H = -0.3125$ mm. Equation (24a) then gives the stop shift parameter as $$\epsilon = 1.1111111.$$

Figure 10:
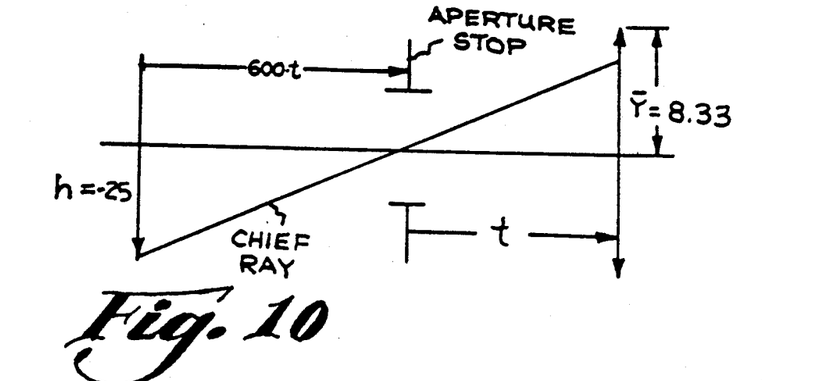
FIG. 10 is a simplified layout of the object space of the lens system shown in FIG. 9.

We now need to find how to relate $\epsilon$ to actual stop location. First note that since $\bar{y} = 0$ before the stop shift (stop in contact with the lens), the quantity $\delta \bar{y}0$ in Eq. (7) is just equal to the new value (after the stop shift) of $\bar{y}0$ at the lens. So, we want $\bar{y} = \epsilon y = (1.1111111)(7.5 \text{ mm}) = 8.3333333$ mm.
Referring to FIG. 10, which shows the object space of the lens, we can use similar triangles to set up the equation $$\frac{8.33}{t} = \frac{25}{600 - t} \tag{27}$$

where t is the distance from the stop to the lens. Solving this equation for t yields $t = 150$ mm. This means that the stop is placed 150 mm to the left of the lens. The remaining aberrations are $S^*_I = 7.91 \times 10^{-4}$ mm and
$S^*_V = 0.0011$ mm.

These values correspond to a maximum wavefront spherical aberration of $0.1563\lambda_0$ and a maximum fractional distortion of $-0.1736\%$ (third-order values). The spherical aberration may be corrected by placing a suitably designed zero-power aspheric surface at the aperture stop plane.

The invention also provides a diffractive laser scanning lens. There is shown schematically in FIG. 11, a diffractive singlet which focuses a plane wave onto a flat image plane ($S^*_{III} = S^*_{IV} = 0$), with no coma ($S^*_{II} = 0$), so that the focused spot does not change shape over the field (image plane). The aperture stop is formed on a scanner which may be a rotating mirror (polygon) or hologon (holographic diffraction grating which rotates) and is shown in FIG. 11 as on a mirror. In addition, we require enough distortion in order that the image height is given by the rule $Y = f \cdot \theta$, rather than $Y = f \tan(\phi)$, which is the rule for a distortion corrected lens. This "f - theta" condition provides a linear scan and a constant scan velocity. The aperture stop location given by the design equations determines the position of the scanner. To design this lens, called an f-$\theta$ scan lens we will assume that collimated illumination is used. Thus, we use Eqs. (25) with $T = -1$ (object at infinity) and $$S^*_{V,scan} = \tfrac{2}{3} yu^3. \tag{28}$$

Equation (28) is the proper amount of distortion for the f - $\theta$ condition. Equation (10) is derived from considering the proper amount of transverse ray aberration for an image height proportional to $\theta$, namely $$\epsilon_y = f\theta - f\tan(\theta) = f\left[\theta - \left(\theta + \frac{\theta^3}{3} + \ldots\right)\right]. \tag{29}$$

The transverse ray aberration polynomial term for third-order distortion has the form $\epsilon_y = \sigma_5 h^3$, where h is the normalized object height. Equation (29) reveals that the coefficient $\sigma_5$ is equal to
$$\sigma_5 = \tfrac{1}{3}fu^{-3}. \tag{30}$$

Use of the relationship between wavefront aberration and transverse ray aberration, i.e.

$$\epsilon_y = \frac{1}{n'u'} \frac{\partial W(h,\rho,\cos\phi_r)}{\partial \rho_y}, \tag{31}$$

where W in the wavefront aberration and $\rho$ and $\phi_r$ are the polar pupil coordinators ($\rho$ is the normalized radius coordinate), results in Eq. (28).
For a curved scan lens, since $T = -1$, Eq. (24) means $$G_{scan} = 0 \tag{32}$$

Equations (25c) and (28) require $$B_{scan} = -1 \tag{33a}$$

or, equivalently, $$c_{sub, scan} = -\frac{\phi}{2} = -\frac{1}{2f} \tag{33b}$$

This means that the radius of curvature of the substrate is equal to twice the focal length, and that the center of curvature lies to the left of the diffractive lens. Also, Eq. (24a) yields $$\epsilon = \frac{2\bar{u}}{3y\phi}. \tag{34}$$

Use of Eq. (34) provides that the stop to lens distance t, which is $$t = \frac{2f}{3} \tag{35}$$

For planar Scan Lens, where the diffractive lens is on a planar substrate, there can still be provided a flat field ($S^*_{III} = S^*_{IV} = 0$) and the f - theta condition, but no control over the coma. There are actually two solutions to this problem. The parameters for the solutions are given below.

Solution A $$G = \frac{\phi^3 \left(1 - \frac{\sqrt{3}}{2}\right)}{8\lambda} \tag{36a}$$

$$t_{stop-lens} = f\left(1 + \frac{\sqrt{3}}{3}\right) \quad (36b)$$

Solution B $$G = \frac{\phi^3\left(1 + \frac{\sqrt{3}}{2}\right)}{8\lambda} \quad (37a)$$

$$t_{stop-lens} = f\left(1 - \frac{\sqrt{3}}{3}\right) \quad (37b)$$

Solution A results in a system with a smaller amount of coma, but solution B is preferable from the standpoint of a smaller scanner-to-lens distance.

The zone spacing is determined from G using equation (26).

As an example scan lens, consider the following parameters, which were chosen to correspond to a scan of an 8.5 inch paper width with a maximum scan angle of $+/-20$ degrees. The f-number was chosen to provide an Airy disk diameter which corresponds to 300 spots per inch. The size of the aperture stop determines the f-number of the focused beam (assuming a fixed focal length). Since spot size is proportional to f-number, aperture stop size controls the number of resolvable spots in the image plane.

Focal length: $f = 310$ mm
Design wavelength $\lambda_0 = 0.6328$ μm
F-number: F/50

Figure 14A:
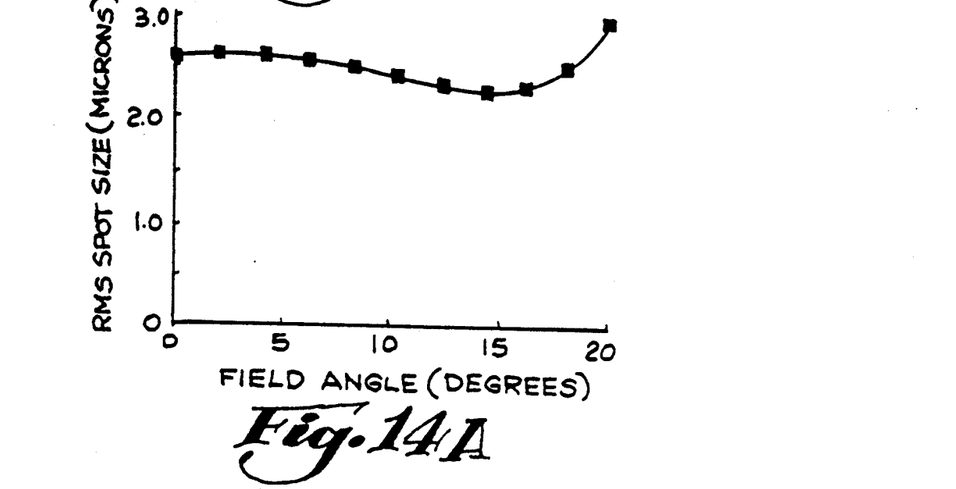
FIGS. 14A and 14B, respectively, are plots of root-mean-square spot radius (geometrical) and image height versus input scan angle for an exemplary curved diffractive scan lens in accordance with the invention. The design parameters were: focal length, f=310 mm; design wavelength, $\lambda_0$=0.6328 $\mu$m; f-number, F/15. With these parameters, the Airy disk radius is approximately 11.7 microns, which corresponds to about 1000 resolvable spots per inch.
Figure 14B:
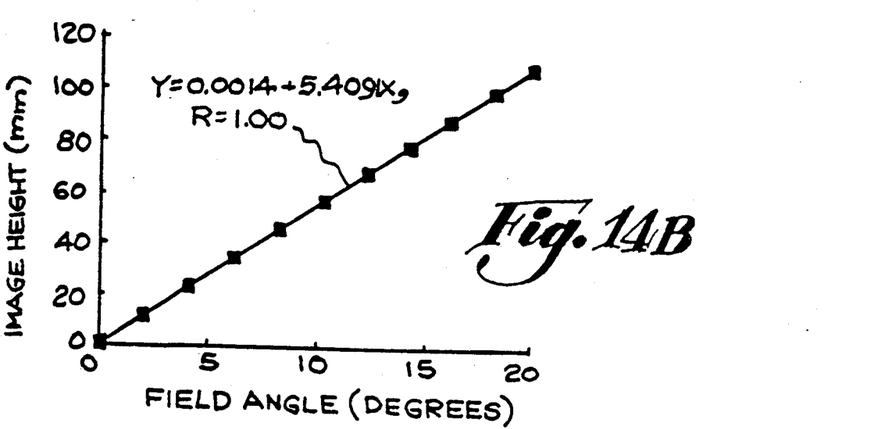

For the curved scan lens, $G=0$, $c_{sub} = -1/620$ mm$^{-1} = -1/(2f)$, and $t=206.66$ mm $=(2/3)f$. For the planar scan lens, solution B gives $G = 1.2373 \times 10^{-5}$ and $t = 131.0214$ mm. plots of root-mean-square geometric spot radius and image height vs. input beam angle are shown in FIGS. 12A to 14A and in FIGS. 12B-14B respectively. High resolution (smaller spot size) is obtained by increasing the area of the aperture stop, i.e. decreasing the F-number as stated above in the description of FIGS. 12-14. The Airy disk radius for these parameters is about 39 microns, so one can see that the curved lens is essentially diffraction limited over this field of view. The increase in spot size at higher scan angles for the curved lens is due to higher order aberrations. The increasing spot size for the planar lens is due to uncorrected third-order coma. The linear nature of the image height curves indicates the high degree of f-theta correction. FIGS. 14A and B, which show the spot size and image height for the curved scan lens with an aperture size chosen for a resolution of approximately 1000 dots per inch. The aperture diameter was increased to decrease the f-number, and thereby decrease the Airy disk diameter.

A blazed diffractive lens is desirable to achieve high diffraction efficiency. The blazing may be fabricated by precision machining, molding, or photolithographic and etching techniques.

The scan angle may be limited by the size of lens which can be fabricated. For a given wavelength, $\lambda$, and F-number, F/#, the smallest zone width, $s_{min}$, is approximately given by the formula $$s_{min} = 2\lambda F/\# \quad (38)$$

To avoid vignetting, the semi-aperture of the lens, S.A., should satisfy $$S.A. \geq y + \bar{y}. \quad (39)$$

For the parameters of the 300 dots/inch curved scan lens given in the previous section, the minimum lens semi-aperture is 78.3 mm. This means that the F-number of the lens itself is F/1.98. Equation (39) then gives a minimum zone width of 2.5 microns for $\lambda = 0.6328$ microns. To reduce manufacturing cost or for ease of manufacture, it is possible to have each zone of the diffractive lens cover two (or more) Fresnel zones, thus approximately doubling (or more) the feature sizes and modulation depth. The latter technique is useful only for systems utilizing monochromatic illumination.

The cost of lens systems embodying the invention can be vastly less than the cost of the comparable conventional glass or holographic lenses since the lens of the invention can be fabricated with conventional zone plate technology as by stamping with a suitably profiled dye.

From the foregoing description, it will be apparent that an improved diffractive imaging lens system has been provided in accordance with the invention. While various embodiments of the invention have been set forth, variations and modifications therein and other embodiments within the scope of the invention will undoubtedly suggest themselves to those skilled in the art. Accordingly, the foregoing description should be taken as illustrative and not in a limiting sense.

We claim:

1. A method of reducing aberrations in an image of an object formed by a diffractive optical element having an optical axis, using an aperture stop which has an aperture, said object being on the object side of said element and said image being formed on the image side of said element, which said method comprises the step of positioning the aperture stop so that the optical axis of the element passes through the aperture and with the stop at a location on the object side and away from said element a sufficient distance from said element to reduce said aberrations.

2. The method according to claim 1 wherein the diffractive optical element has a focal length for a design wavelength $\lambda_0$ and focuses light of wavelength $\lambda_0$, said distance being equal to the product of the focal length of said element and the ratio $$\frac{\lambda_o}{\lambda}$$

where $\lambda$ is the wavelength of light from said object which illuminates said element and f is the focal length for $\lambda$ equal to $\lambda_0$.

3. The method according to claim 1 wherein said distance is equal to the focal length of said element.

4. The method according to claim 1 wherein light from the object passes through the aperture and the element and further comprising the step of removing any phase variation of the light passing through said aperture by an amount sufficient to correct spherical aberration of said image.

5. The method according to claim 1 wherein said element has a plurality of successively spaced zones, said zones each having a width defined by $\gamma m + 1 - \gamma m$ where r depends on wave length $\lambda_0$ and focal length f according to the following relationship:

$$r_m = \sqrt{2m\lambda_0 f}$$

and which further comprises adjusting the width of said zones by a distance sufficient to reduce said aberrations when said element has a finite focal length with respect to light of wave length λ from said object, where m is an integer.

6. The method according to claim 1 wherein the positioning step comprises translating said aperture stop position in relation to the position of said element to provide sufficient distortion in said image as manifested by the height of said image being proportional to the product of the focal length of said element and a ray angle, θ, between the optical axis of said element and a beam of light through said element which is incident on said image so that the beam of light through said element scans across a plane containing said image at constant velocity.

7. The method according to claim 1 further comprising the step of bending said element a sufficient amount to provide correction for at least one of said aberrations.

8. A diffractive optical imaging system which comprises a diffractive optical element having an optical axis, a focal length, f, for light of wavelength $\lambda_0$ from an object which illuminates said element and forms an image of the object, said element having a front focal plane and an image plane on object and image sides thereof, said focal plane and image plane being perpendicular to the optical axis of said element, said image being focused in said image plane, an aperture stop disposed on the one of said sides wherein the object or image is located furthest from the element such being the longest conjugate distance at a distance from said element sufficient to reduce aberrations in said image.

9. The system according to claim 8 wherein said stop is located in said front focal plane with the aperture thereof intersected by said optical axis.

10. The system according to claim 8 wherein said stop is located a distance t from said element where $$t(\lambda) = \frac{\lambda_0}{\lambda} f.$$

where λ is the wavelength of light which forms said image.

11. The diffractive optical element and the aperture stop comprising an optical system according to claim 8 wherein said element has a zone structure of m zones each of radius r from said optical axis, the radii of said zones having the following relationship:

$$r_m = \sqrt{xm\lambda_0 f}$$

where x is an integer and the location of said stop is defined by $$t(\lambda) = \frac{\lambda_0}{\lambda} f$$

where t is the distance of the stop from said element and λ is the wavelength of light forming the image.

12. The system according to claim 8 further comprising a phase corrector element in said aperture for correcting spherical aberration of said image due to said element.

13. The system according to claim 11 wherein said element is an anamorphic element and said zones are parallel to each other, r being the spacing of said zones from a centerline of said element running through the center of said element and coincident with the optical axis of said element.

14. The system according to claim 11 wherein said element has a surface relief structure with a height profile defined by the following equations:

$$h(r) = h_{max}\left(1 - \frac{r^2}{2\lambda_0 f} + M\right),$$

where $$h_{max} = \frac{\lambda_0}{n(\lambda_0) - 1},$$

$$M = m - 1 \text{ for } r_{m-1} \leq r < r_m.$$

15. The system according to claim 11 where said element is a lens and said object and image sides are on opposite sides of said lens.

16. The system according to claim 8 wherein said aperture has a margin, said element has power φ and has finite conjugates with said object a finite distance from said element, said element has a conjugate parameter T where $$T = \frac{m+1}{m-1}$$

where m is the paraxial lateral magnification of said element, and said distance is proportional to $$\frac{2H}{y^2 \phi(2T)}.$$

where y is the height above the optical axis on the element of a marginal ray from the optical axis at the object plane through the margin of said aperture.

17. The system according to claim 16 wherein said element is bent and has a radius of curvature to a point on the optical axis and said distance is proportional to $$\frac{2H}{y^2 \phi(B + 2T)}$$

where $$B = \frac{2 C_{sub}}{\phi}$$

and $C_{sub}$ is the reciprocal of the radius of curvature of the element about a point on the optical axis.

18. The system according to claim 16 wherein said element provides for imaging at the image plane at a design wavelength $\lambda_0$ and the element has zones of width which are determined by $$\frac{\phi^3(1 - T^2)}{32\lambda_0}$$

where $\lambda_0$ is the design wavelength of the element.

19. The system according to claim 8 wherein said lens is an f - θ scan element of focal length f and said distance is about (⅔)f.

20. The system according to claim 19 wherein said lens has a finite curvature from the center about the optical axis about a center along the optical axis on the object side of said lens.

21. The system according to claim 20 wherein the reciprocal of radius of said curvature is approximately $-\frac{1}{2} f$.

22. The system according to claim 8 wherein said element is designed for imaging at a design wavelength and is a planar f-θ scan lens of focal length f, power $\phi$, and design wavelength λ, said distance is either $$f\left(1 + \frac{\sqrt{3}}{3}\right) \text{ or } f\left(1 - \frac{\sqrt{3}}{3}\right)$$

and said lens has Fresnel zones which are of width related to $$\frac{\phi^3\left(1 - \frac{\sqrt{3}}{2}\right)}{8\lambda} \text{ or } \frac{\phi^3\left(1 + \frac{\sqrt{3}}{2}\right)}{8\lambda}.$$

23. The system according to claim 8 wherein said element is a scan lens disposed in the path of a beam which is scanned across the image plane, a scanner for deflecting said beam and causing it to be scanned across the image plane, said scanner having a surface from which said beam is deflected, and said scanner defining said aperture stop on said surface.

24. The method according to claim 1 whenever said positioning step is carried out to position said aperture stop on the side of said element which has the longest conjugate distance.

25. The method according to claim 1 where said object is effectively at infinity as said positioning step is carried out to position said stop on said object side.

* * * * *